(12) United States Patent
Kaartinen

(10) Patent No.: US 6,311,713 B1
(45) Date of Patent: Nov. 6, 2001

(54) FREEZE VALVE

(76) Inventor: Niilo Kaartinen, Vuolahti, FIN-21620 Kuusisto (FI)

( * ) Notice: Subject to any disclaimer, the term of this patent is extended or adjusted under 35 U.S.C. 154(b) by 0 days.

(21) Appl. No.: 09/720,422

(22) PCT Filed: Jun. 21, 1999

(86) PCT No.: PCT/FI99/00543

§ 371 Date: Jan. 29, 2001

§ 102(e) Date: Jan. 29, 2001

(87) PCT Pub. No.: WO99/67693

PCT Pub. Date: Dec. 29, 1999

(30) Foreign Application Priority Data

Jun. 22, 1998 (FI) .......................................................... 981432

(51) Int. Cl.$^7$ .................................................... F17D 1/16
(52) U.S. Cl. ............................ 137/13; 137/827; 137/828
(58) Field of Search ..................................... 137/827, 828, 137/13

(56) References Cited

U.S. PATENT DOCUMENTS

| | | | |
|---|---|---|---|
| 3,591,809 | * 7/1971 | Laakaniemi et al. | 137/842 |
| 4,612,959 | * 9/1986 | Costello | 137/828 |
| 4,637,071 | * 1/1987 | Pitt et al. | 359/147 |
| 5,311,896 | * 5/1994 | Kaartinen | 137/15 |
| 5,465,582 | * 11/1995 | Bliss et al. | 62/51.1 |
| 5,694,502 | 12/1997 | Byron . | |

FOREIGN PATENT DOCUMENTS

| | | |
|---|---|---|
| 0 113 820 | 7/1984 | (EP) . |
| 57850 | 6/1980 | (FI) . |
| 100278 | 10/1997 | (FI) . |
| WO 90/12350 | 10/1990 | (WO) . |
| WO 94/29690 | 12/1994 | (WO) . |

* cited by examiner

Primary Examiner—Michael Powell Buiz
Assistant Examiner—Thomas L. McShane
(74) Attorney, Agent, or Firm—Rothwell, Figg, Ernst & Manbeck

(57) ABSTRACT

The invention concerns a freeze vale (2) for controlling the flow of small quantities of liquid in a conduit (1). Further objects of the invention are a network of conduits, a method of opening a freeze valve and a process for the separation of liquid fractions, which all involve the freeze valves (2) of the invention. The freeze valve (2) s defined by a tubular wall (3) integral with the conduit (1) and includes a thermal bridge (4) connecting the wall to a heat sink (5), to close the valve by freezing the liquid inside the wall, as well as a heating element (11) including a source of laser beam targeted at a wall, to open the valve by melting the frozen liquid (7). According to the invention the laser beam (13) is produced in the form of a transversally extended shroud and targeted at the wall (3) at a length extending to both sides of the point of connection (6) to the thermal bridge (4), so as to melt the block of frozen liquid (7) simultaneously along its entire length. The beam (13) can have the form of a divergent fan or flattened cone with across section corresponding to the elongate ice block (7) inside the wall and a radiation intensity higher in the center (15) of the beam and decreasing towards the beam edges (16). The beam can be obtained from a laser diode (11) and tailored and/or directed by optical means (12) as necessary. The network of conduits with freeze valves can be employed in analyzers for clinical chemistry, and the separation processes can be capillary electrophoresis or chromatography, where the freeze valves are used to immobilize the separated liquid samples.

24 Claims, 3 Drawing Sheets

FREEZE VALVE

Figure 1:
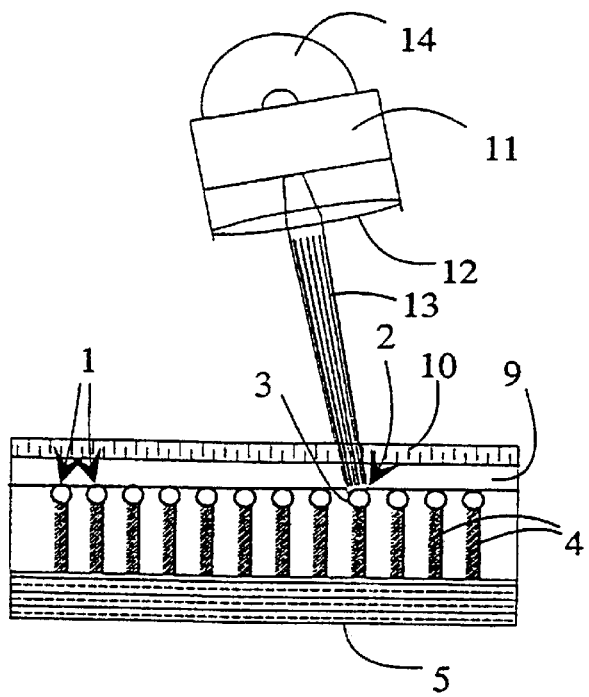

The present invention concerns a freeze valve for controlling the flow of small quantities of liquid in a conduit, the valve being defined by a tubular wall integral with said conduit and comprising a thermal bridge connecting said wall to a heat sink, to close the valve by freezing the liquid inside the wall, as well as heating means comprising a source of laser beam targeted at the wall, to open the valve by melting the frozen liquid.

Further objects of the invention are a network of conduits that comprises a plurality of freeze valves, a method of opening a freeze valve as well as a process for the separation of liquid or colloidal fractions from a liquid flow, particularly in capillary electrophoresis and chromatography.

In the FI patent 57850 and the U.S. Pat. No. 5,311,896 there are described systems for handling small batches of liquid comprising a plurality of chambers as well as conduits interconnecting said chambers, each of said conduits being provided with at least one valve which is shut by refrigeration, i.e. by freezing the liquid inside the valve. To that end, each valve is connected to a continuously operated refrigerator constituting a heat sink capable of maintaining the valve at a temperature below the melting point of the liquid. For selective opening of the valves each of them is provided with a separate heating element which, when activated, increases the temperature to melt the frozen liquid. As the heating is switched off, the refrigerator automatically returns the valve to said low temperature where the liquid, if present at the site of the valve, is in a frozen state.

In the two prior art patents cited above the heating element is taught to be an electric resistor lying adjacent the tubular shell of the valve which is of heat conductive metal. The selective control of the valves is thus achieved by controlling the electric current in the resistors.

Such systems are intended for liquid analyzers comprising a large store of liquid samples and reagents and performing operations such as mixing, incubation, detection etc. Said operations are those routinely performed e.g. in clinical chemistry. The freeze valves are non-wearing, self-sealing, hermetic and can be made extremely small and, consequently, the systems utilizing them have the advantages of avoidance of moving mechanical parts, the possibility for automatic control of the system, compactness as well as small size of the liquid samples that are being handled.

However, the electric resistors used as heating elements in the above mentioned prior art patents have drawbacks that have so far prevented the use of liquid handling systems with freeze valves for practical commercial applications. As described in the U.S. Pat. No. 5,311,896 the valve comprises a shell of metal defining the space where the liquid will freeze, and a strip-formed thermal bridge connecting the shell to a heat sink. The electric resistor is positioned in this bridge close to its tip soldered to the metallic shell, but still necessarily at some distance from it. This is due to the soldering process that would damage the sensitive resistor if present in the soldered area. The handicap then is that a considerable part of the heat generated does not reach the shell but is shortcircuited to the heat sink. Another detriment is the need of an isolating plastic layer to prevent access of the current to the shell of the valve. This isolation has also a poor heat conductivity, and therefore it retards the heat flow to the shell and prolongs the time needed to open the valve.

To give an example, assume that the tubular electroformed nickel shell of the valve according to U.S. Pat. No. 5,311,896 has a length of 3 mm, a diameter of 0.3 mm and a wall thickness of 0.02 mm. The shell is connected to a permanent heat sink through a soldered thermal bridge which is a metal strip having a width of 2.5 mm and a thickness of 0.25 mm and carrying an insulated resistor sheet structure of a length of 4 mm. These are the minimum dimensions of this type of thermal bridge that can be manufactured reliably. The solid mass of the thermal bridge is thus about 50 times the mass of the shell of the valve, and the bridge does not allow for a packaging thickness of the valves less than said 2.5 mm, even though the shell could be made much smaller.

In operation closing of a prior art valve as described above does not cause any major problems. The amount of liquid contained in the valve body is about 0.00002 ml and will freeze to close the valve in 20 milliseconds. However, the freezing does not stop there but continues for about 1–2 seconds at a progressively diminishing rate so that the length of the ice block will be about ten times the shell diameter and its total volume will be within a range up to about 0.0003 ml. To open the valve this ice block must be melted along its entire length, and the process here is reverse to that of freezing the valve, i.e. the melting starts rapidly but proceeds then more and more slowly towards the ends of the elongate block. It has turned out that opening the valve will require an amount of heat that is about 10 to 1000 times the net heat flow needed to block it. This is impractical as such, but even more of a problem is the prolonged time needed to turn the valve open.

In the U.S. Pat. No. 5,311,896 there is also a brief mention of the use of a laser beam for heating the freeze valve. However, the disclosure is silent upon how the heating would be arranged in practice and does not cite any advantage to be gained thereby. The detailed teachings relate to the use of electric resistors which must be concluded to be the preferred way of heating. There is nothing to suggest the problems related thereto and nothing to teach how to obviate them.

It is therefore an object of the invention to provide a freeze valve which will overcome the drawbacks of the prior art valves or alleviate them to a degree letting the valves be used in practical systems handling small quantities of liquid. Accordingly, the invention has the aim of providing a freeze valve where the ice block can be melted and the valve turned open substantially faster than what is the case in the prior art valves. The invention also aims to let the valve be opened with a substantially reduced energy consumption, especially in the stand-by mode where most valves are most of the time. Furthermore, the invention has the aim of reducing the size of the valve as an operative unit to allow a tighter packaging of valves and thereby reducing the size of the systems of conduits and valves used for purposes such as analyzers for small liquid samples.

A further object of the invention is to provide a freeze valve achieving the abovementioned goals with the use of a laser beam in a specific novel manner.

A still further object of the invention is to provide an improved process for the separation of liquid or colloidal fractions in a liquid flow with the aid of freeze valves employing a laser beam as means to open the valves.

The freeze valve according to the invention is thus characterized in that there are means provided for producing a laser beam in the form of a transversally extended shroud and targeting said shroud at the wall at a length extending to both sides of the point of connection to the thermal bridge, to melt the block of frozen liquid simultaneously along its entire length.

In contrast to the prior art technique of heating the wall of the valve from a single central point, the concept of the present invention is to spread the heating energy to the whole length of the ice block inside the valve. This is achieved by use of a shroud-formed laser beam emitted from a suitable laser source or a laser beam turned to the desired shroud-form by optical means. These measures will considerably accelerate melting of the block through its whole length as is necessary for getting the valve open. At the same time there is no loss of heating energy to the heat sink.

Preferably, said shroud-formed laser beam has the form of a divergent fan or cone with a radiation intensity higher in its center and decreasing towards its edges. Such a distribution of laser energy is advantageous in heating the ice block evenly along its entire span, considering that heat is being conducted in the tubular wall surrounding the block. The conducted heat compensates for the lower share of the radiant energy directed to the ends of the block.

Furthermore, the shroud-formed laser beam may have the form of a fan or a flattened cone having an elongate cross-section substantially corresponding to the elongate block of frozen liquid formed within the tubular wall of the valve. Tailoring of the laser beam to the length and breadth of the ice block can be done by optical means, by mechanical means such as a moving mirror or, depending on the laser source, merely by a suitable location of the source. The advantage is that the laser energy is in its entirety used for melting the ice block, without any lost energy missing the target.

A preferred laser source for use in the present invention is a laser diode. There exist laser diodes producing divergent, fan-like laser beams with a radiation intensity distribution suitable for the purposes of the invention. However, a beam collimating optics can be installed between the laser diode and the valve if necessary.

The invention avoids the electrical resistors of the prior art valves, which means that there are no electrical leads in the vicinity of the valves that would require space and thereby set limitations to packing the valves in tight arrays. As the thermal bridges are freed from the heating function and merely serve the freezing they too can be designed substantially narrower than in the prior art valves. As a result the invention enables a packing density for the valves about five times higher than in the prior art systems. Another significant advantage of avoidance of the resistors is the diminished thermal mass of the valve.

According to a preferred set-up the shroud-like laser beam is directed to the wall of the valve from a side opposite to the side attached to said thermal bridge.

The tubular wall of the valve can be of metal, manufactured and designed in the manner described in the U.S. Pat. No. 5,311,896, incorporated herein by reference. The metal structure of chambers, conduits and valves is advantageous in systems where mixing, incubation and detection operations are performed for analytical purposes and the valves are selectively opened and closed to control the transfer of liquid samples in the network of conduits.

According to another embodiment of the invention the conduit is of an electrically isolating material, covered by a sleeve of metal at the site of the valve, the thermal bridge being attached to said sleeve. The isolating material can be plastic or glass, quartz glass being preferred. Such a structure can advantageously be used in capillary electrophoresis in which colloidal fractions are separated from a liquid in an electrically non-conductive tube between a pair of electrodes. The metal conduits and valves as taught in U.S. Pat. No. 5,311,896 could not be used for the purpose, and the electrically heatable thermal bridge described in said patent combined with a plastic or glass conduit would be unworkable as well, due to the poor heat conductivity of the conduit material. However, these problems are overcome by heating the valve with a shroud-formed laser beam according to the teachings of the present invention. The dependency of the valve on heat conducted by the tubular wall in the longitudinal direction to the valve necks is limited or nil, so that the thermal mass of the valve can be reduced as far as technically possible.

Another advantageous use for freeze valves according to the above embodiment is in liquid chromatography, which is performed in a glass tube or column for separating dissolved ingredients contained in a liquid. Also here the shroud-formed laser beam according to the invention effectively opens the valves, while the metal structure and electrical heating as described in U.S. Pat. No. 5,311,896 would be useless.

A further development of said embodiment comprising a plastic or glass conduit is to provide another sleeve of metal around the conduit at a short distance from the sleeve lying at the site of the valve. Said another sleeve has the purpose of conducting ambient heat to the conduit wall to control the size of the ice block that will be formed. Provision of a protruding metal flange will further enhance the capture of heat from the ambient atmosphere. An active temperature control of said another sleeve e.g. with a laser beam together with a suitable shape of the valve body enables a quantitative control of the size and the shape of the frozen block for the purpose of sample injection.

While it is possible that each one of the freeze valves in a system handling batches of liquid is provided with a laser diode of its own, the invention also covers the use of a single laser diode in a network of conduits for selective heating of a plurality of valves within the range of the beam as produced. The laser diode may thus be movable so that the beam can be targeted to a number of adjacent valves within said network. A stepper motor can advantageously used for rotating the laser diode as needed. Instead of moving the laser diode a movable mirror can be used to direct the beam selectively to different valves. If the movements of the laser diode or the mirror are fast enough a virtually simultaneous opening of two or more adjacent valves can be achieved with the use of the single diode.

The method of opening a freeze valve as contemplated by the invention involves a valve defined by a tubular wall integral with a conduit transferring small quantities of liquid and comprising a thermal bridge connecting said wall to a heat sink, the valve being closed by a block of frozen liquid inside the wall. The method comprises heating of the valve by means of a laser beam targeted at the wall, to open the valve by melting the frozen liquid, and is characterized in that the beam is produced in the form of a transversally extended shroud and targeted at the valve to cover the block of frozen liquid inside the wall substantially along its entire length.

Preferably the laser beam is produced in the form of a divergent fan or cone with a radiation intensity higher in its center and decreasing towards its edges, the beam being targeted at the valve centrally so as to produce maximal heating at the point of connection to the thermal bridge. A laser diode is a suitable means to produce the beam, assisted by collimating optics as desirable.

As noted in the above, the invention also comprises a process for the separation of liquid or colloidal fractions from a liquid flow. The invention thereby includes novel embodiments of the capillary electrophoresis or liquid chromatography techniques that are known as such. In the process said fractions migrate in a main conduit line at different speeds and a fraction is separated by leading it into to a branch conduit and immobilized therein by closing said branch conduit by means of a block of ice.

So far, a capillary electrophoresis process that utilizes freezing of conduits is previously known from the publication PCT/EP94/01790. This reference teaches driving a fraction to be separated to a branch conduit to a substantial distance from the main conduit, and freezing the branch conduit ahead of the fraction, i.e. from the side opposite to the main conduit. Freezing is achieved by blowing cold carbon dioxide upon the spot of the conduit where the ice block will form, and the block is subsequently melted simply by terminating the cold blow. The main deficiency of this technique is that the branch conduit is left half open which gradually dilutes the fraction by mixing in spite of the precautionary measures taken. Also to let the ice block melt "by itself" is inordinately slow.

The improved process according to the invention is based on the advantageous use of a shroud-like laser beam to open a freeze valve in a conduit, enabling rapid operations in processes that may involve large numbers of fractions separated and analyzed. The process is characterized in that the branch conduit is provided with a freeze valve defined by a tubular wall integral with said conduit and comprising a thermal bridge connecting the wall to a heat sink, to close the valve by freezing the liquid inside the wall, as well as heating means for opening the valve by melting the frozen liquid, the heating means producing a laser beam in the form of a transversally extended shroud, and that the process comprises leading said fraction to be separated to the site of said freeze valve or beyond it, closing the valve by freezing it, and recovering said fraction by targeting the shroud of laser radiation at the valve causing the block of frozen liquid to melt simultaneously along its entire length.

In this process the ice block isolates the separated fraction from the main conduit line so that any migration of components leading to mixing of the fractions is prevented. The use of the shroud-formed laser beam is not limited by the material of the conduit which makes it particularly suitable to capillary electrophoresis and chromatography, which normally utilize conduits and columns made of glass.

According to a specific embodiment of the process of the invention the fraction that is being separated is received in the space defined by the tubular wall of the valve and frozen in its entirety.

This represents a novel approach in the freeze valve technique where instead of closing a valve in order to block the flow of a liquid sample left behind it, or a flow of another liquid in the reverse direction, the freezing capacity of the valve is used for solidifying the sample as such. In other words, the ice block is not just a borderline between separated quantities but the aimed separated quantity as such.

A separation process may involve driving apart and immobilization of a plurality of fractions in parallel branch conduits, followed by selective recovery of the fractions one at a time, by melting the ice block trapping the fraction and leading the fraction further in the system of conduits, e.g. into a mass spectrometer or other analyzing equipment. The invention thus provides means for preserving the separated fractions in a state where diffusion has been prevented, for subsequent analysis, as opposed to the prior art processes bound to analyse the issuing peak fractions immediately. As the capacity of the analysing equipment is usually low this has meant that in the prior art most of the peak fractions have been lost.

Figure 2:
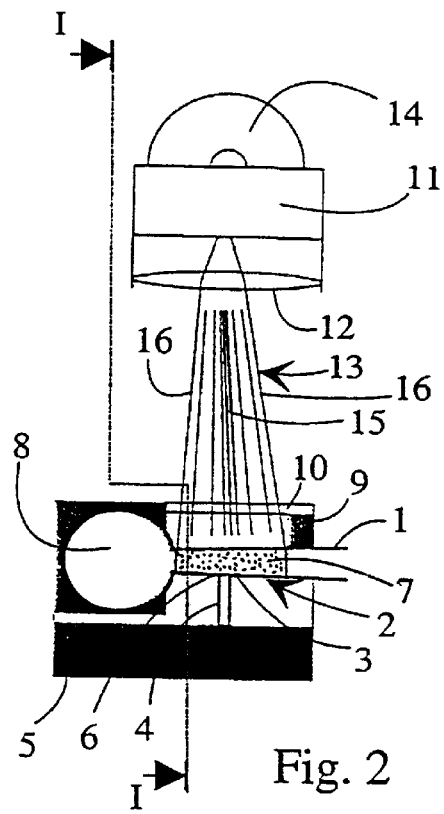
Figure 3:
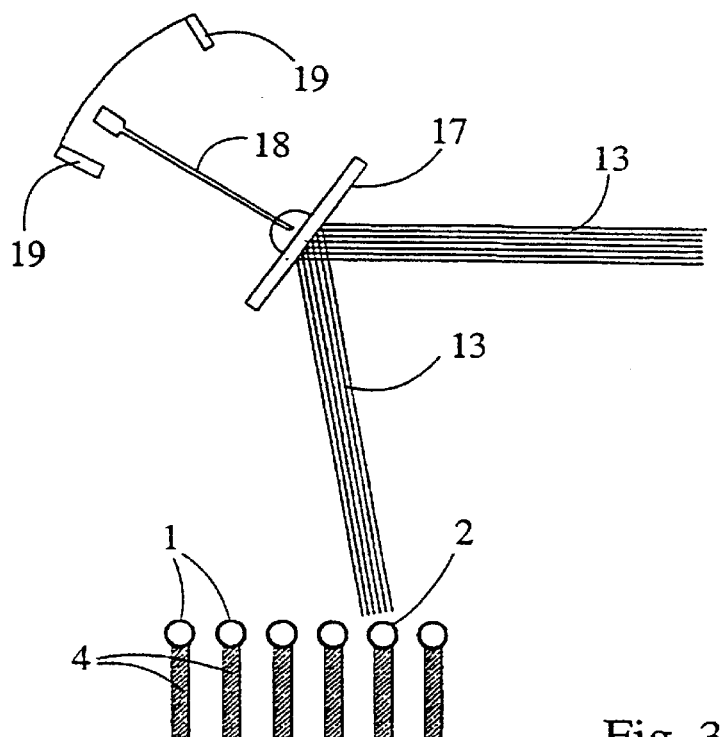
Figures 4, 5:
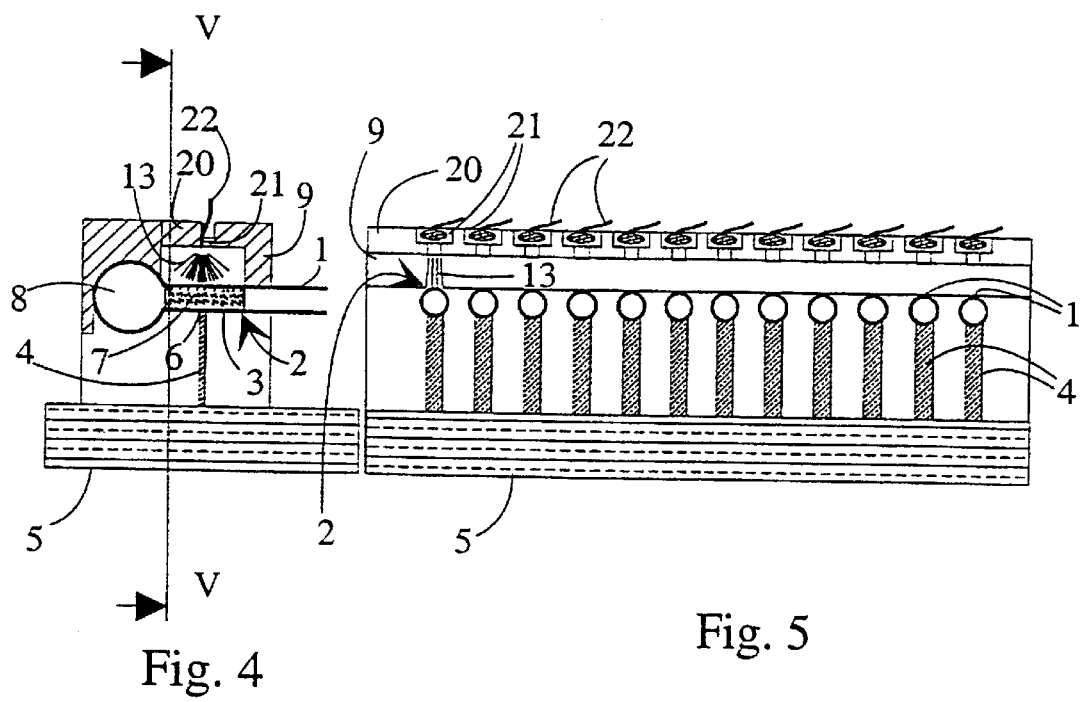
Figure 6:
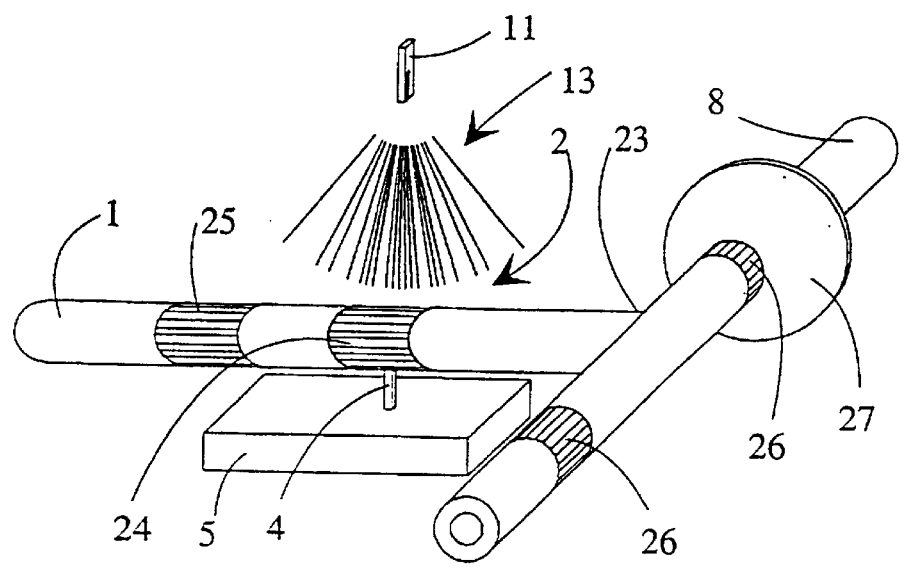
Figure 7:
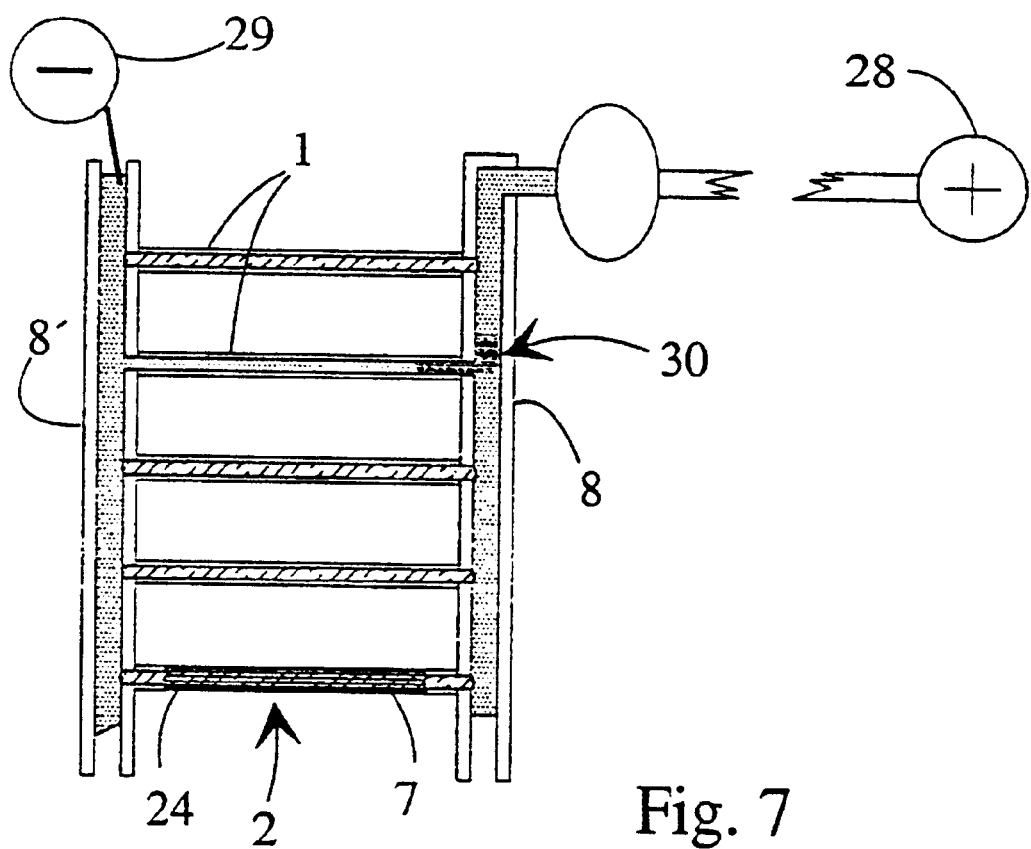

The invention is described in the following in more detail with reference to the attached drawings, wherein FIG. 1 shows an array of freeze valves in parallel conduits and a rotatable laser beam passing collimating optics and targeted at one of the valves, the figure being a cross-section I—I from FIG. 2, FIG. 2 is a side view of the valve heated with the laser beam as shown in FIG. 1, FIG. 3 is a cross-sectional view similar to FIG. 1 but showing a laser beam targeted at a selected valve through a rotatable mirror, FIG. 4 is a side view of another freeze valve heated with a fan-shaped laser beam, FIG. 5 is a cross-section V—V from FIG. 4, showing the valve of FIG. 4 as one of a set of parallel valves each of which is provided with a laser source of its own, FIG. 6 shows the junction of a main and a branched conduit line made of glass and provided with a freeze valve heatable with a fan-shaped laser beam, and FIG. 7 shows a set of branch conduits between main conduit lines for immobilization of separated liquid fractions in capillary electrophoresis.

With reference to FIGS. 1 and 2 there is depicted a set of parallel conduits 1 for the transfer of small liquid samples. The conduits 1 form a part of a system comprising a network of liquid chambers, conduits between said chambers, and valves in said conduits for controlling the transfer operations. Said valves are freeze valves 2 defined by a tubular wall 3 integral with the respective conduit 1 made of metal. The metal structures can be manufactured by electroformation as described in detail in U.S. Pat. No. 5,311,896. For example, the conduits 1 can be of nickel and have a diameter of about 0.3 mm, a wall thickness of about 0.02 mm, and a mutual distance of 0.16 mm, thus allowing a packaging thickness of 0.5 mm per conduit. The freeze valves 2 are closed by freezing the liquid inside the wall 3 and opened by heating the valve so that the ice block will melt.

Each freeze valve 2 is connected through a thermal bridge 4 to a common heat sink which is formed by a continuously operated refrigerator 5 and has a temperature in the range of e.g. −25 to −35° C. The thermal bridge 4 is a narrow metal wire, for example a copper wire of a diameter of 0.1–0.2 mm and a length of about 1 mm, attached to the tubular metal wall 3, the attachment 6 defining the center of the freeze valve 2. As the valve 2 is filled with liquid and there is no heating going on, a block of ice 7 will form inside the tubular wall 3, the freezing starting at the center 6 of the valve which has the connection to the heat sink 5. The freezing will then proceed so that a balance is reached where the ice block 7 extend to a distance on both sides of the center point 6, said distance depending on the operation and the specific parameters of the valve. According to FIG. 2 the ice block 7 extends to a main conduit line 8 connecting a set of branch conduits 1, the latter being the parallel conduits 1 seen in FIG. 1. On the opposite side the length of the ice block 7 is regulated by a metal rim 9 lying against the conduit wall. The metal shell of the main conduit 8 and the rim 9 are held at a regulated temperature and bring heat to the surroundings of the valve, thereby setting limits to the growth of the ice block.

The array of parallel valves 2 in the conduits 1 is hermetically closed with an optically transparent cover 10. Heating means for selective opening of the valves 2 is constituted by a laser diode 11, such as a near infra red power laser diode, with planar optics 12 for collimating the laser beam 13 that is targeted at the valve 2 to be opened. The laser diode is installed to the rotatable shaft 14 of a stepper motor enabling directing the beam 13 to any of the parallel valves 2 seen in FIG. 1.

According to the invention the laser beam 13 emitted by the diode 11 is with use of the collimating optics 12 tailored to a divergent shroud having the form of a fan or flattened cone, with a cross-section corresponding to the length and breadth of the ice block 7 as is seen in FIGS. 1 and 2. The beam 13 is thus targeted precisely at the wall area covering the block 7 causing melting simultaneously at the entire length of the block. Furthermore, the fan-shaped beam 13 has a radiation intensity distribution such that the maximum intensity occurs in the middle 15 of the beam and decreases towards its both edges 16. This leads to an equalized heat distribution over the length of the ice block 7 due to the fact that the metal wall 3 will passively conduct heat between the center and the peripheral areas of the valve.

The embodiment of FIG. 3 differs from that of FIGS. 1 and 2 in that there is a rotatable mirror 17 which targets the laser beam 13 to the selected freeze valve 2 to be opened. The movements of the mirror 17 are achieved galvanometrically by means of a shaft 18 positioned between a pair of electromagnets 19. The beam 13 is obtained from a stationarily installed laser diode and aligned by collimating means (not shown) to a shroud corresponding to the dimensions of the ice block. The mirror 17 then reflects the shroud unchanged onto the valve area 2 to be heated. The rotation of the mirror 17 is fast enough to let the beam 13 heat a plurality of valves simultaneously by way of a to-and-fro movement.

FIGS. 4 and 5 depict a set of parallel conduits 1 and freeze valves 2, where the individual conduits and valves are essentially similar to those shown in FIGS. 1 and 2. However, instead of the rotatable laser diode common to all of the valves there is an integrated laserbar 20 running transversally over the valves 2 and having a plurality of semiconducting stripes 21 as laser beam sources, each valve 2 being provided with a laser source of its own. The stripes 21 emit near infra red radiation at a wavelength of e.g. 808 nm and have connecting lines 22 letting them be controlled individually. The laser beam 12 obtained from the source 21 has the form of a flat, transversally divergent fan which extends over the ice block inside the valve as the source is at a sufficient distance from the valve. At each valve 2 a rim 9 of metal extends from the laserbar 20 to the conduit wall, working as a heat source to establish a limit to the ice block formed within the valve.

In FIG. 6 there is shown a junction 23 between a main conduit line 8 and a branch conduit 1 provided with a freeze valve 2. In this embodiment the conduits 1, 8 are made of quartz glass which is electrically non-conductive and conducts heat considerably poorer than metals used in the previous examples. The inner diameter of the conduits may be of the order of 100 $\mu$m and the outer diameter of the order of 200 $\mu$m. Such conduit systems find use in applications such as capillary electrophoresis and liquid chromatography.

At the site of the valve 2 the quartz conduit is surrounded by a sleeve 24 of metal, e.g. copper, which has a connection to a heat sink 5 through a narrow metal wire 4 as described in connection with FIGS. 1–2. Another sleeve 25 of metal is surrounding the branch conduit 1 on the side of the valve opposite to the junction point 23, to pass ambient heat to the conduit so as to control the length of the ice block formed inside the valve, and, similarly, two further metal sleeves 26 surround the main conduit 8 with the purpose of setting the other end of the ice block level with the main conduit at the point of junction 23. One of these latter sleeves 26 is provided with a metallic flange 27 to capture heat from ambient air and to bring it to the conduit. A laser source such as laser diode 11 provides a divergent, fan-shaped laser beam 13 targeted at the valve area to open the valve by melting the ice block. When installed at a suitable distance from the valve 2 the beam 13 emitted by laser diode 11 can be utilized as such without any tailoring by optical means.

A network of conduits 1, 8, 8' suitable for performing capillary electrophoresis is shown schematically in FIG. 7. The process separates chemical compounds moving in narrow glass tubes between a potential difference of tens of kilovolts. The separation is based on different speeds of migration of different liquid fractions. These fractions may be very small, typically of the order of a few nanoliters.

The system of FIG. 7 comprises two main conduits 8, 8' with conduit ends at reverse potentials 28, 29 as shown, and a number of parallel branch or intermediate conduits 1 between the main conduits. Both the main and the intermediate conduits are made of quartz glass which is electrically non-conductive. Each of the intermediate conduits 1 has a sleeve of metal 24 as described with reference to FIG. 6, as well as connections to a heat sink and a laser beam source (not shown) to form a freeze valve 2 which effectively extends over the entire length of the intermediate conduit. Any of the intermediate conduits 1 can thus be filled with a liquid fraction which is immobilized by freezing it in its entirety, the ends of the ice block 7 that is formed being level with the respective main conduits 8, 8'.

A capillary electrophoresis separation process can be carried out so that the conduits 1, 8, 8' are initially filled with a buffer solution and the intermediate conduits 1 except one are closed by ice that fills them. The liquid sample is fed to the network from the direction of the positive pole 28 and a potential difference through the liquid is set up between the poles 28, 29. A fraction 30 migrating towards the negative pole 29 will separate and enters the single intermediate conduit 1 that has been left open, as can be seen in FIG. 7. The fraction 30 will fill said intermediate conduit and is trapped therein by freezing it down at the moment it is reaching the second main conduit line 8'. After this, another intermediate conduit 1 will be opened with heat from the laser source, so that the process may continue. Another more slowly moving fraction may now fill said another intermediate conduit and be trapped therein by freezing it at the right moment. In this manner a desired number of fractions with different speeds of migration can be captured and preserved in the network system for further processing, especially analyzing with a mass spectrometer. At that stage the fractions can be melted selectively one by one and transferred to the analyzer, without any losses due to limitations in the capacity of the latter.

A network of conduits with freeze valves for capturing and preserving liquid fractions substantially as described above may be employed even in other separation processes, where the fractions are obtained as a sequential flow, especially in liquid chromatography.

The above examples are given merely by way of illustration, without limiting the invention, the scope of which is defined by the ensuing claims.

I claim:
1. A method of opening a freeze valve (2) controlling the flow of small quantities of liquid in a conduit (1, 8), the valve being defined by a tubular wall (3) integral with said conduit and comprising a thermal bridge (4) connecting said wall to a heat sink (5), the valve being closed by a block of frozen liquid (7) inside the wall, the method comprising the step of heating the valve by means of a laser beam (13) targeted at the wall, to open the valve by melting the frozen liquid, characterized in that the laser beam (13) for heating the valve (2) is produced in the form of a transversally extended shroud with a radiation intensity higher in its center (15) and decreasing towards its edges (16), and targeted at the valve to cover the block of frozen liquid (7) inside the wall (3) substantially along its entire length.

2. A method according to claim 1, characterized in that the laser beam (13) is produced in the form of a divergent fan or cone with a radiation intensity higher in its center (15) and decreasing towards its edges (16), the beam being targeted at the valve (2) centrally so as to produce maximal heating at the point of connection (6) to the thermal bridge (4).

3. A method according to claim 2, characterized in that the laser beam (13) is produced by a laser diode (11).

4. A process for the separation of liquid or colloidal fractions from a liquid flow, wherein said fractions migrate in a main conduit line (8) at different speeds and a fraction (30) is separated by leading it into to a branch conduit (1) and immobilized therein by closing said branch conduit by means of a block of ice (7), characterized in that the branch conduit (1) is provided with a freeze valve (2) defined by a tubular wall integral with said conduit and comprising a thermal bridge (4) connecting the wall to a heat sink (5), to close the valve by freezing the liquid inside the wall, as well as heating means (11) for opening the valve by melting the frozen liquid (7), the heating means producing a laser beam (13) in the form of a transversally extended shroud with a radiation intensity higher in its center (15) and decreasing towards its edges (16), and that the process comprises leading said fraction (30) to be separated to the site of said freeze valve or beyond it, closing the valve by freezing it, and recovering said fraction by targeting the shroud of laser radiation at the valve causing the block of frozen liquid to melt simultaneously along its entire length.

5. A process according to claim 4, characterized in that the laser beam (13) is in the form of a flattened cone having an elongate cross-section substantially corresponding to the elongate block of frozen liquid (7) formed inside the tubular wall of the valve (2), and having a radiation intensity in the center (15) of the cone higher than that at the cone edges (16).

6. A process according to claim 4, characterized in that the fraction (30) that is being separated is received in the space defined by the tubular wall of the valve (2) and frozen in its entirety.

7. A process according to claim 4, characterized in that the conduit (1) is of an electrically isolating material covered by a sleeve of metal (24) at the site of the valve (2), the thermal bridge (4) being attached to said sleeve.

8. A process according to claim 7, characterized in that the process is capillary electrophoresis separating a liquid or colloidal fraction (30) from a liquid medium.

9. A process according to claim 4, characterized in that the process is a chromatographic separation process separating soluble liquid fractions.

10. A process according to claim 4, characterized in that a number of fractions (30) are led to different branch conduits (1) and immobilized therein, and that said fractions are selectively recovered for analysis, such as mass spectrometry.

11. A freeze valve (2) for controlling the flow of small quantities of liquid in a conduit (1, 8), the valve being defined by a tubular wall (3) integral with said conduit and comprising a thermal bridge (4) connecting said wall to a heat sink (5), to close the valve by freezing the liquid inside the wall, as well as heating means (11, 20, 21) comprising a source of laser beam targeted at the wall, to open the valve by melting the frozen liquid (7), characterized in that there are means provided for producing a laser beam (13) in the form of a transversally extended shroud with a radiation intensity higher in its center (15) and decreasing towards its edges (16), and targeting said shroud at the wall (3) at a length extending to both sides of the point of connection (6) to the thermal bridge (4), to melt the block of frozen liquid (7) simultaneously along its entire length.

12. A freeze valve according to claim 11, characterized in that said means produce a laser beam (13) in the form of a divergent fan or cone with a radiation intensity higher in its center (15) and decreasing towards its edges (16).

13. A freeze valve according to claim 12, characterized in that the laser beam (13) is in the form of a flattened cone having an elongate cross-section substantially corresponding to the elongate block of frozen liquid (7) formed within the tubular wall (3) of the valve (2).

14. A freeze valve according to claim 11, characterized in that the heating means comprise a laser diode (11).

15. A freeze valve according to claim 14, characterized in that the laser diode (11) is provided with beam collimating optics (12).

16. A freeze valve according to claim 11, characterized in that the laser beam (13) is targeted at the wall (3) of the valve at a side opposite to the side attached to said thermal bridge (4).

17. A freeze valve according to claim 11, characterized in that the wall (3) defining the valve is of metal.

18. A freeze valve according to claim 11, characterized in that the conduit (1, 8) is of an electrically isolating material such as plastic or glass, covered by a sleeve of metal (24) at the site of the valve (2), the thermal bridge (4) being attached to said sleeve.

19. A freeze valve according to claim 17, characterized in that a first sleeve (24) of metal covers the conduit (1) at the site of the valve (2), and a second sleeve (25, 26) of metal around the conduit (1, 8) is provided at a distance from the first sleeve.

20. A freeze valve according to claim 19, characterized in that said second sleeve (26) has a protruding metal flange (27) to carry heat to the conduit from the ambient atmosphere.

21. A freeze valve according to claim 11, characterized in that the thermal bridge (4) comprises a thin metal wire attached to a central point (6) of the tubular wall (3).

22. A network of conduits comprising a plurality of freeze valves (2) as defined in claim 11, characterized in that there is provided a laser diode (11) which is movable to let the laser beam (13) be targeted selectively at a number of adjacent valves (2) within said network.

23. A network according to claim 22, characterized in that the laser diode (11) is provided with rotating means such as a stepper motor (14), to let the beam (13) be targeted selectively at an array of parallel valves (2).

24. A network of conduits comprising a plurality of freeze valves (2) as defined in claim 11, characterized in that there is provided a laser diode with a mirror (17) for targeting the laser beam (13) selectively at a number of adjacent valves (2) within said network.

* * * * *